Sept. 16, 1941.  A. SCHATZ ET AL  2,256,172
ROLL-FILM CAMERA
Filed April 18, 1939  2 Sheets-Sheet 1

Inventors:
AUGUST SCHATZ
JOSEF BRAUN
RUDOLF HEIM
BY Haseltine, Lake & Co.
Attorneys Sept. 16, 1941. A. SCHATZ ET AL 2,256,172
ROLL-FILM CAMERA
Filed April 18, 1939 2 Sheets-Sheet 2

Inventors:
AUGUST SCHATZ
JOSEF BRAUN
RUDOLF HEIM
BY Haseltine, Lake & Co
Attorneys Patented Sept. 16, 1941

2,256,172

UNITED STATES PATENT OFFICE 2,256,172

ROLL-FILM CAMERA

August Schatz, Josef Braun, and Rudolf Heim, Triberg, Germany

Application April 18, 1939, Serial No. 268,514
In Germany September 7, 1935

3 Claims. (Cl. 95—31)

The present invention relates to a roll-film camera having a driving mechanism for feeding the film and for winding and releasing the shutter, said driving mechanism being actuated by means of a spring motor and influenced by a control mechanism actuated by means of a release. In order to obtain a form which is as compact and handy as possible, particularly for miniature cameras in which there is only a limited space available for the feeding device and the device for winding the shutter, the arrangement according to the invention is such that the shutter, together with the cases containing the two spools from and on to which the film is wound, and the spring motor, are disposed one behind the other at the rear of the lens and that both the control mechanism influenced by the release as well as the driving mechanism driven by the spring motor are disposed in a flat chamber adjacent one of the side walls of the camera.

A metallic sliding shutter may be disposed adjacent the inside of the front wall of the housing which carries the release, said housing having its longer axis parallel to the optical axis of the camera and its shorter axis transversely thereof. A particularly satisfactory utilization of the space results when the driving mechanism, driven by the spring motor and designed as a flat train of gears, together with the control mechanism is separated from the interior of the camera by means of a partition wall which at the same time acts as a mounting for the driving and controlling members, and when the control mechanism is adapted to regulate both the unwinding of the train of gears for feeding the film forward as well as the winding and unwinding of the shutter by means of a flat system of levers for each operation.

The invention is illustrated by way of example in the accompanying drawings wherein:

Fig. 3a shows the levers in the position of rest and Fig. 3 shows the levers when released.

Figure 1:
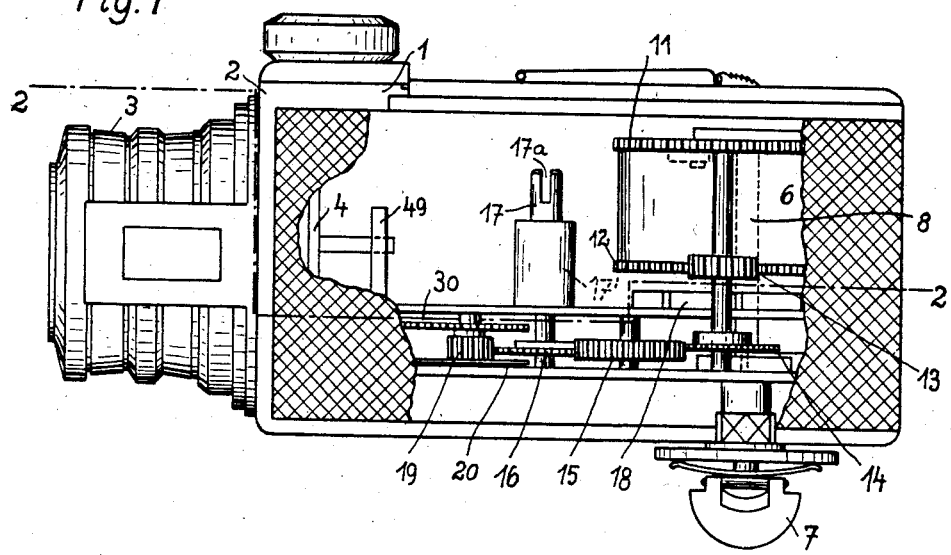
Figure 1 illustrates a plan view of the camera with part of the housing broken away.
Figure 2:
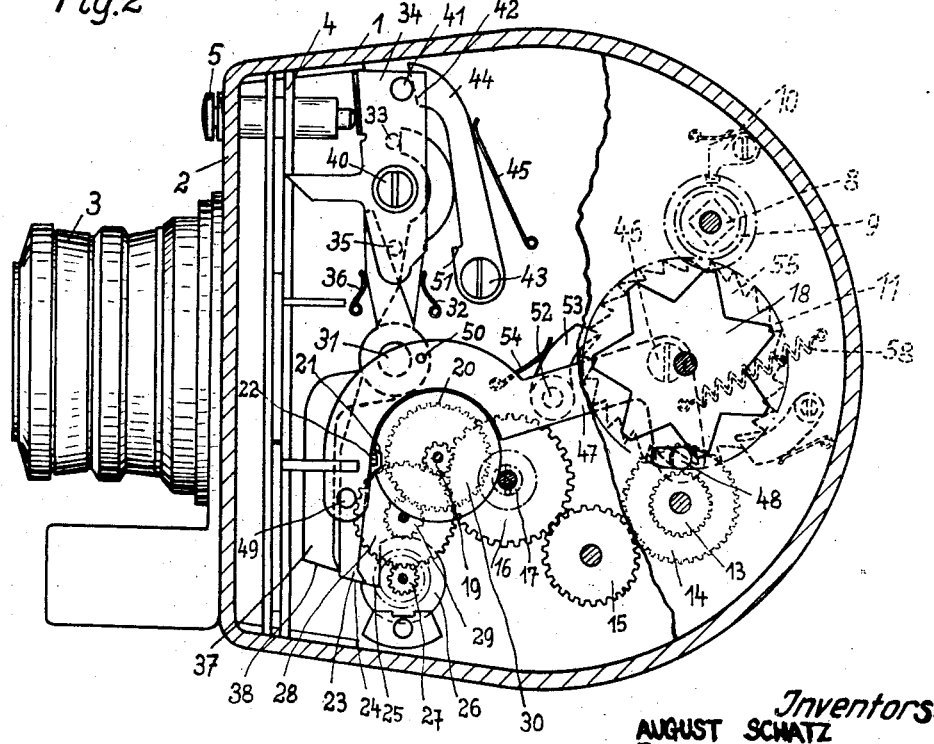
Figure 2 is a section on the line II—II of Figure 1.
Figure 3:
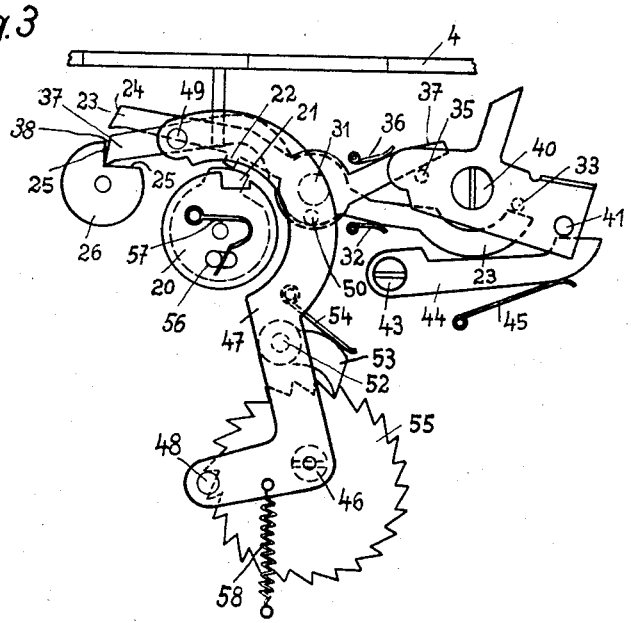
Figures 3 and 3a are views of the set of levers.
Figure 3A:
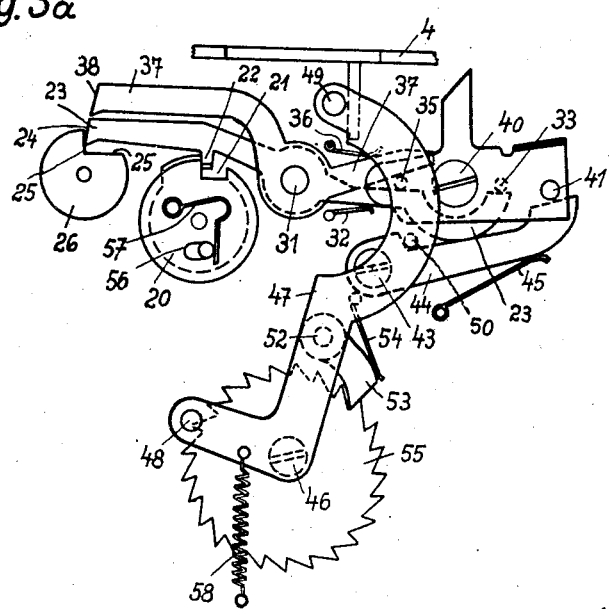

The horseshoe-shaped housing 1 of the camera carries, in its flat front wall 2, a lens 3 of any desired design the rear opening of which is covered or uncovered by means of a sliding shutter 4 located in the interior of the camera. The sliding shutter itself forms no part of the present invention, so there is no necessity to describe it here in detail. The sliding shutter may for example be designed as described and illustrated in German Patent 90,399. The release 5 which in this case is designed as a push-button passes through the front wall 2 of the camera and is movable in the direction of the exposure.

The driving mechanism comprises a spring motor 6, which can be wound by means of a key 7 through the gearwheel 9 connected to the shaft 8 of the motor 6 and the gearwheel 11 held by the pawl 10 the said key 7 being located on the outside of the camera housing. The spring motor 6 acts both by means of the apertaining gearwheel 12 which is connected to the housing and the further transmission gearwheels 13, 14 and 15 upon the driving gearwheel 16 mounted on the pin 17 which carries the spool on to which the film is wound, and also by means of the starwheel 18, which is also connected to the housing, upon the lever mechanism for rewinding the shutter. The spool itself on to which the film is wound forms no part of the present invention, so there is no need to describe it in detail here. For the purpose of connecting the pin 17 to the aforesaid spool, the said pin is provided at its free end with a fork 17a, in which a transverse pin provided on the spool may mesh when the spool is inserted, so that when the pin 17 rotates the spool also rotates.

The gearwheel 16, the shaft of which extends into the interior of the camera housing and forms the supporting and driving pin 17 for the spool on to which the film is wound, meshes also with a gearwheel 19, on the shaft of which there is mounted a disc 20 having a notch 21 in which a projection 22 of a control lever 23 may engage. At one end of said control lever 23 there is located a stop face 24 cooperating with a notch 25 upon an arresting disc 26. On the shaft of the arresting disc 26 there is located a gearwheel 27 cooperating with a gearwheel 28, on the shaft of which there is mounted a gearwheel 29 meshing with a gearwheel 30 provided upon the shaft of the notched disc 20.

The control lever 23 is pivotable about a pivot pin 31 and is pressed against a pin 33 by means of a small spring 32, said pin 33 being located at one end of a short actuating lever 34. Said lever 34 carries at the other end a further pin 35, against which bears an arresting lever 37 which is also pivotable about the pivot pin 31 and under the influence of a small spring 36, the other end of said arresting lever 37 possessing a stop face 38 which can be moved in the path of the notch 25 upon the arresting disc 26.

The actuating lever 34 pivotable about a pivot pin 40 is provided with a pin 41 actuating an arrest surface 42 of the safety lever 44 being pivotable about the pin 43 and being influenced by the spring 45. A winding lever 47 being mounted to pivot about the pin 46 carries on its shorter arm a roller 48 which engages the starwheel 18. The longer arm of the winding lever 47 is provided with a pin 49 which retains the sliders of this shutter 4 under tension, the sliders lying one behind the other. In its position of rest the pin 50 of the tensioning lever 47 engages behind the nose 51 of the safety lever 44 and retains the shutter under tension.

The longer arm of the tensioning lever 47 is in addition provided with a pawl 53 pivotable about the pivot point 52 and held in engagement with the teeth of a gear wheel 55 by means of a small spring 54, said gear wheel acting as a number disc.

The spools from and on to which the film is wound are located in special cases which are adapted to be mounted on the two pins 17 and 17', the pivotable pin 17 acting as drive for the spool on to which the film is to be wound as aforesaid.

The driving mechanism works in the manner hereinafter described, it being assumed that a full film case has been inserted in the camera housing, that the cover 1' thereof is closed and that the spring motor 6 has been wound by means of the key 7.

When the push button 5 is depressed for the purpose of making an exposure, the actuating lever 34 is pivoted about its pivoting point 40, and thus acts by means of the pins 33 and 35 arranged thereon, upon the control lever 23 and the arresting lever 37 so as to pivot the said two levers in the opposite direction about their common pivoting point 31. As a result of this the control lever 23, which in its position of rest bears with its stop face 24 opposite the notch 25 of the arresting disc 26, moves outwardly until its stop face 24 is released from the notch 25 and its projection 22 leaves the notch 21 of the disc 20. At that moment the train of gears which is under the action of the spring motor 6 would unwind but for the fact that in the meantime the arresting lever 37 which is moved simultaneously with the lever 23 but in the opposite direction, reaches a position in which its stop face 38 lies in the path of the notch 25. The cam disc 56 lying behind the notched disc 20 and being influenced by the action of a spring 57 now has the opportunity to rotate clockwise through a few degrees, thereby masking the notch 21 in the disc 20. Thereby the nose 22 of the lever 23 is prevented from entering the notch 21.

In this position of the parts the train of gears is arrested, so long as the push-button remains depressed.

During the depressing of the push-button 5 the safety lever 44 is pivoted about the point 43 simultaneously with the lever 34, until its cam 51 is disengaged from the pin 50 on the tensioning lever 47. At that moment the tensioning lever 47 is allowed to pivot under the action of the spring 59. As a result of this pivoting the tensioning lever 47 disengages from the sliders of the shutter 4 which until then it had retained under tension, so that an opening of the shutter and thus also an exposure of the film are effected. When the shutter is set to instantaneous exposure the shutter closes automatically at the end of the exposure period to which it is set, whilst in the case of a bulb exposure the shutter is not closed until the push-button 5 is released.

After the exposure of the film, that is to say during the return motion of the push-button 5 to its initial position the film moves forward and the shutter is rewound in the following manner.

Owing to the return motion of the push-button 5 the levers 23 and 37 are allowed to return to their initial position. The lever 37 thus disengages from the notch 25 on the arresting disc 26 so that the train of gears may unwind until the projection 22 of the control lever 23, which during the unwinding of the train of gears slides over the circular periphery of the cam disc 20, again snaps into the notch 21 of said disc and its stop face 24 is again located in front of the notch 25. The duration of the unwinding of the gear train is such that the film receiving spool driven by the pin 17 is rotated by an amount such that a fresh section of the film is pulled in front of the picture opening in the case.

At the same time as the film is unwound by one picture length the shutter is rewound by the aid of the star wheel 18 which is firmly connected to the housing of the spring motor 6. When the gear train unwinds, during which time also the spring motor housing rotates, the star wheel 18 is rotated clockwise for a certain distance. During this rotation the tooth of the star wheel 18 which lies behind the pin 48 which is mounted on the lever 47 and is moved obliquely inwardly during the pivoting of the said lever 47, is returned obliquely outwardly and as a result returns the lever 47 to its initial position in which the winding lever 47 is retained owing to the fact that the pin 50 on the lever 47 is then again returned to its position behind the cam 51 of the lever 44. During the return motion of the lever 47 the sliders of the shutter are rewound by means of the pin 49. The camera is thus ready for the next exposure without the necessity for actuating special devices for rewinding the shutter and feeding the film forward.

On one sidewall of the camera housing there is arranged the gearwheel 55 which, after each exposure, is moved forward by one tooth by means of the pawl 53 when the lever 47 moves. On the side of the gearwheel 55 adjacent the said sidewall of the camera are provided figures which successively appear in a small window and indicate the number of film sections which have been automatically moved forward.

What we claim is:

1. A roll-film camera including a housing lens, a tensioned type shutter supported in said housing behind said lens, rotatable means for engagement with a film spool whereby to feed the film on said spool, a spring motor, a gear train means between said spring motor and said rotatable means, shutter release means for releasably holding said tensioned shutter in tensioned condition and movable to release said shutter, and a pair of crossed levers biased to pivot in opposite directions about a common pivot, means with said levers to tension the shutter and to return the shutter release means to holding position, means on said shutter release means for engaging said levers whereby to reverse the same upon movement of said shutter release means to release said shutter, stop means on said gear train, one end of the first of said levers being normally reposed against said stop means, the corresponding end of the other lever being engageable with said stop means upon reversal of said levers whereby to lock said gear train means and said motor against operation until after release of said shutter, and rotatable abutment means rotatable with said gear train and engageable with said first lever upon movement away from position of repose whereby to prevent return thereof after return of said shutter release means to its first position until rotation of said gear train disengages said abutment means from said lever.

2. A roll-film camera as claimed in claim 1, the first lever having a nose thereon, the rotatable abutment means comprising a wheel having an indentation in the edge thereof, for accommodating said nose whereby to allow said first lever to engage said stop mechanism, a cam disk rotatably mounted adjacent said wheel, and a spring engaged between said cam disk and said wheel and normally tending to swing said cam disk to mask said notch whereby to engage said nose to prevent said lever from entering said notch until rotation of said wheel relative to said cam disk and said nose unmasks said notch and brings said notch opposite said nose.

3. In a roll-film camera including a housing, a lens, a tensioned type shutter supported in said housing, a roll film support, a spring motor, film feeding means geared to said motor, and a control mechanism for operating said motor after a picture is taken; operating means for said shutter comprising a lever pivotally supported in said casing and engageable at one end with said shutter to drive said shutter, spring means operably engaged between said lever and said casing whereby to tension said lever to pivot in a shutter driving direction, manually operable catch means mounted in said casing and engageable with said lever to hold the same in tensioned position, and one-way transmission means separate from the film feeding means between said motor and said lever for driving said lever towards said catch means, comprising a pin on said lever and a star wheel rotatably supported in said casing adjacent said pin and driven by said motor, said lever being pivotally supported on a pivot eccentric with respect to the axis of rotation of said star wheel, the arrangement being such that the tooth surfaces of said star wheel slidingly engage with said pin to cam said lever towards said catch, and so that the points of said star wheel pass said pin when said lever is engaged with said catch.

AUGUST SCHATZ.
JOSEF BRAUN.
RUDOLF HEIM.